June 24, 1924.  
C. H. AU  
RECORDER  
Filed July 6, 1923  
1,499,283  
3 Sheets-Sheet 1

June 24, 1924.

C. H. AU 1,499,283

RECORDER

Filed July 6, 1923

RECORDER

Filed July 6, 1923

Inventor
Carl H. Au

By Kramer Cameron Lewis & Kirkbury
Attorneys

Patented June 24, 1924.

1,499,283

UNITED STATES PATENT OFFICE.

CARL H. AU, OF WASHINGTON, DISTRICT OF COLUMBIA, ASSIGNOR OF ONE-HALF TO JOHN C. HOYT, OF WASHINGTON, DISTRICT OF COLUMBIA.

RECORDER.

Application filed July 6, 1923. Serial No. 649,963.

*To all whom it may concern:*

Be it known that I, CARL H. AU, a citizen of the United States, and a resident of Washington, D. C., have invented new and useful Improvements in Recorders, which invention is fully set forth in the following specification.

This invention relates to means for recording a variable force or movement of the class wherein a recording-sheet is advanced at a uniform linear speed past a recording style for tracing a record line on the sheet, which recording style is actuated by the variable force or movement of which a record is to be kept. In my application Sr. No. 512,833, filed Nov. 4, 1921, I have shown, described and claimed a device of this character, which is particularly useful where records are to be made in remote localities and where the device is subjected to frequent inspection and which therefore must be continuously operating over an extended period of time.

The object of the present invention is to provide a machine of this general character which is to be used in localities where more frequent inspection is possible, and to provide such a machine more simple in construction and less expensive to manufacture than that shown in my aforesaid application. With this object in view the invention consists in an ordinary stock-roll, (i. e. a roll upon which the record-sheet is wound as it is received from the paper dealer), combined with any suitable means actuated by the variable force or movement and tracing a record of said force or movement upon the record-sheet, and a receiving roll, upon which the record is wound as made, which receiving roll acts not only to receive the record but also to withdraw the record-sheet from the stock-roll in a right line past the recording style at a uniform linear rate. Any suitable recording means actuated by the variable force or movement may be employed, but preferably I employ the recording means, shown, described and claimed in my aforesaid application.

It is essential that the record-sheet shall move past the style at a uniform linear speed, and therefore the mechanism for advancing the sheet past the style is controlled by a clockwork escapement whereby the rate of movement is timed; furthermore, inasmuch as the record-sheet is wound on the receiving-roll and this winding action of the receiving-roll acts to withdraw the record-sheet from the stock-roll and advance it past the record style, it is apparent that if the receiving-roll revolved at a fixed number of revolutions per unit of time, the paper would be advanced past the recording style at a constantly increasing rate of speed, due to the increasing diameter of the receiving-roll as the paper is wound thereon, and I have therefore provided means whereby, as the paper is wound on the receiving roll and its diameter increased, the speed of revolution of the roll is gradually and uniformly decreased; the net result is that the record-sheet is advanced at all times at a uniform linear rate of speed past the recording-style. I accomplish this uniform decrease in the speed of revolution of the receiving-roll by driving the same through the medium of a weighted cable controlled by the escapement acting on a fuzee formed on the extended end of the shaft of the receiving roll.

By this means the entire machine consists of the recording mechanism, stock and receiving rolls and the timing and winding mechanism. There are other specific details of the invention which will be best understood in connection with the following description. The inventive idea is capable of receiving a variety of mechanical expressions, one of which for the purpose of illustrating the invention is shown in the accompanying drawings, but it is to be expressly understood that such drawings are for purposes of illustration only and not for the purpose of defining the limits of the invention, reference being had to the appended claims for that purpose.

In said drawings:—

Fig. 5 is a plan view of a sheet-creasing device attached to the machine;

Fig. 6 is a perspective view of a sheet-holding clip whereby the end of the record-sheet is retained in the receiving roll at the start of the operation;

Fig. 8 is a vertical section on the line 8—8 of Fig. 5.

Figure 1:
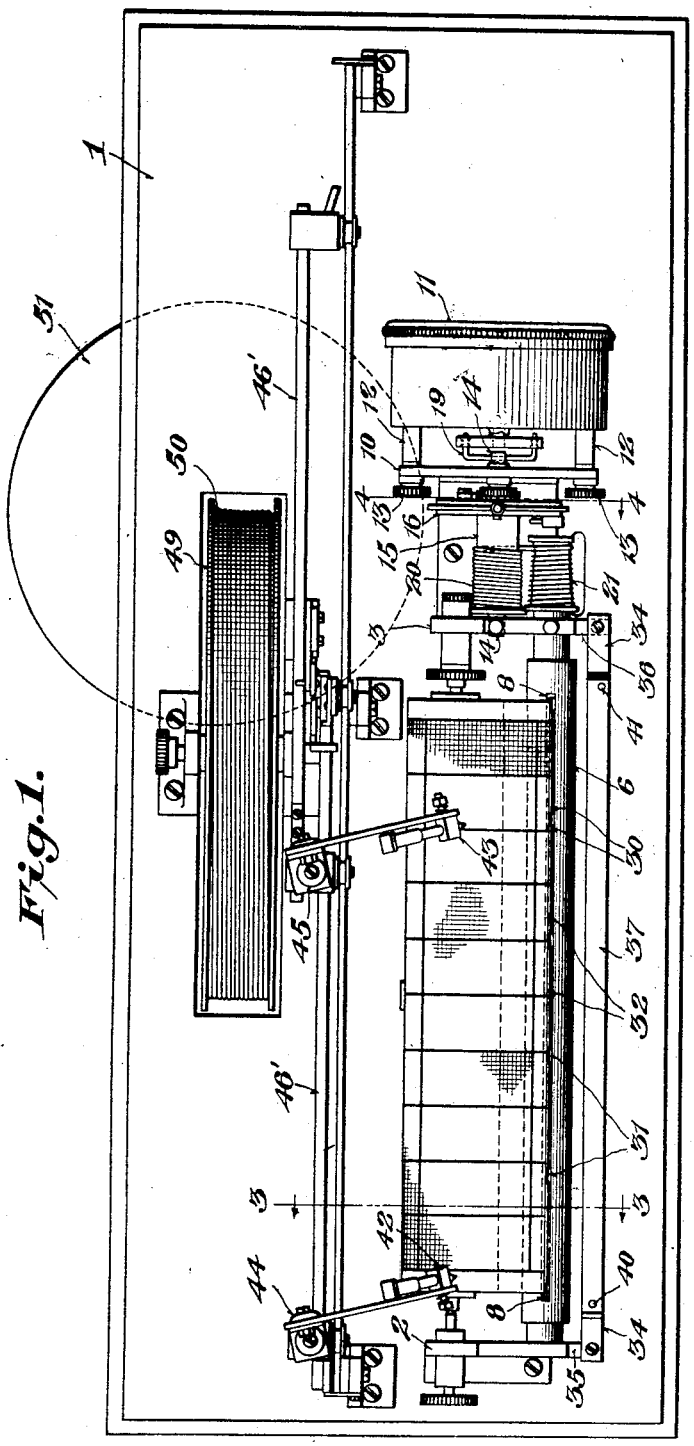
Fig. 1 is a plan view of the invention.
Figure 2:
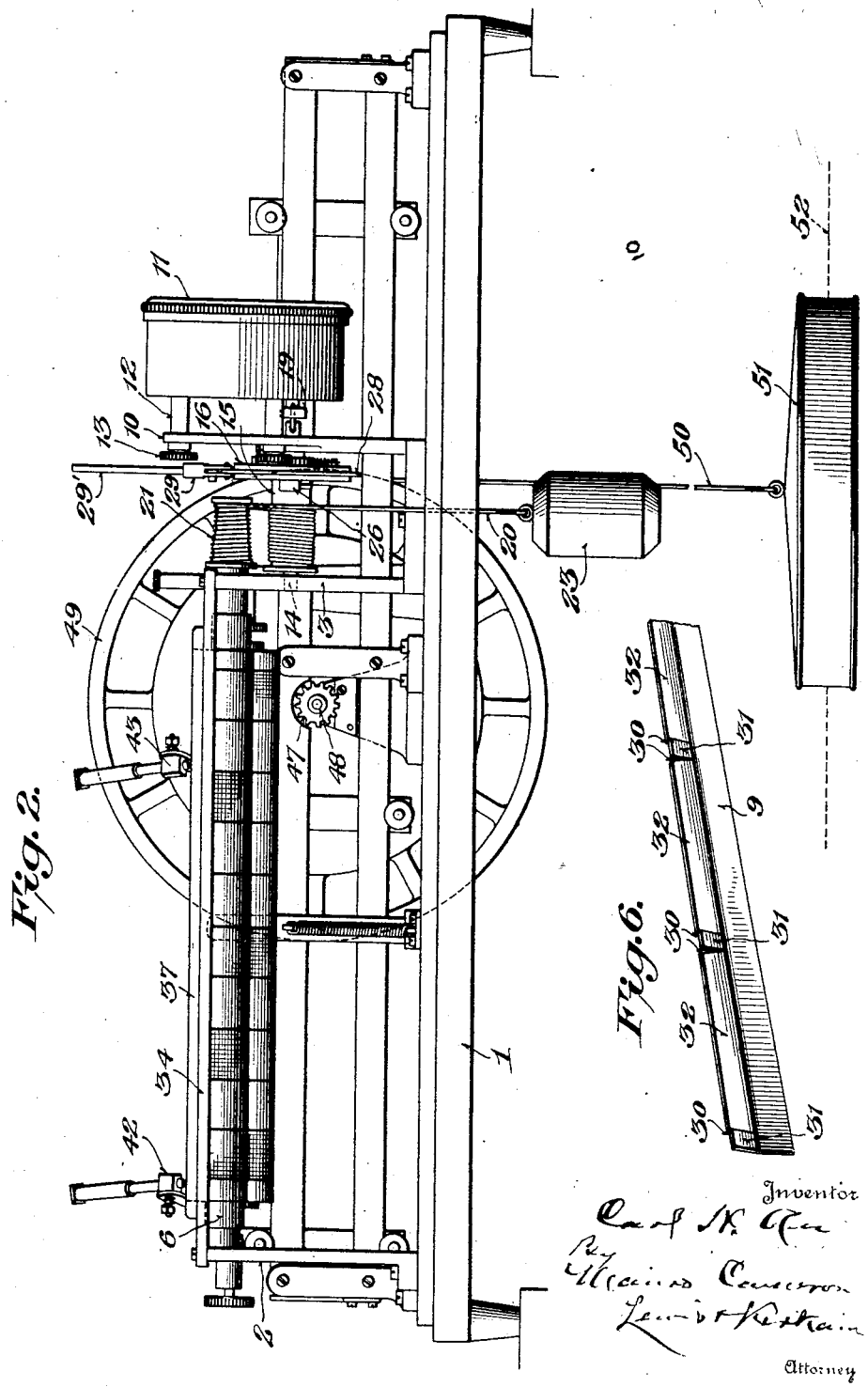
Fig. 2 is a front elevation thereof.
Figure 3:
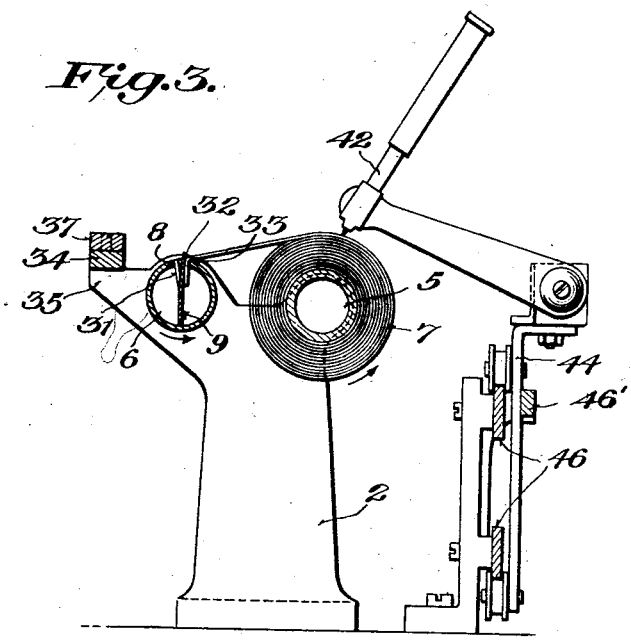
Fig. 3 is a vertical section on the line 3—3 of Fig. 1.
Figure 4:
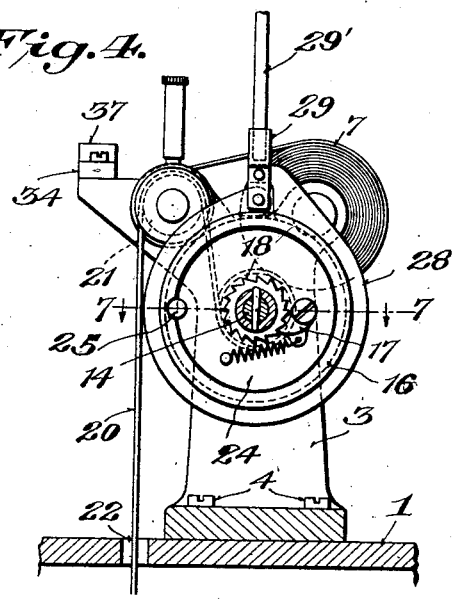
Fig. 4 is a like section on the line 4—4 of Fig. 1.
Figure 7:
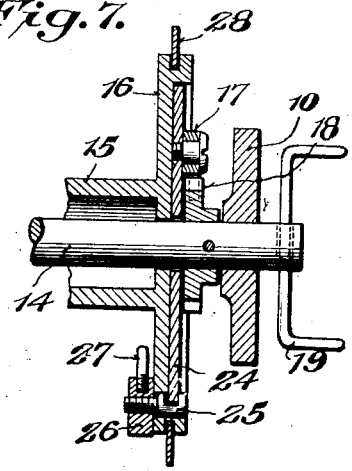
Fig. 7 is a sectional plan view on the line 7—7 of Fig. 4.

Referring to the several views of the drawings, in which like reference numerals indicate corresponding parts throughout the several views, 1 is a base plate, preferably of cast iron with its upper surface carefully dressed. Standards 2 and 3 are secured to the base plate 1 in any suitable manner, as by screws 4, 4 (Fig. 4), within which standards the stock-roll 5 and the receiving roll 6 (Fig. 3) take bearing. One of the stock-roll bearings is of the conical type and longitudinally adjustable to facilitate removal and replacement of the stock-roll, while the other is a cylindrical bearing, but any suitable style of bearing may be employed. As shown in Fig. 3, the stock-roll 5 has a supply of record paper 7 wound thereon, the paper being extended from the top of the roll to the receiving-roll 6, where it enters the slot 8 in the roll and wherein it is retained by a metal strip 9 that will hereinafter be more fully described. A third standard 10 (Fig. 1) supports the clock-work escapement 11 by means of screw-threaded shanks 12, which pass through the standard 10 and are engaged by nuts 13, three of said shanks preferably being employed. In the standards 3 and 10 a shaft 14 has bearing and around said shaft there is loosely mounted a drum 15 provided with a recessed flange 16. A spring pawl 17 (Fig. 4) is pivoted to a disk 24, in the recess of the flange 16, which pawl engages a ratchet wheel 18 pinned on the shaft 14. The periphery of the disk 24 lies in a notch in a stud 25 passing through the flange 16 (see Fig. 7), the projecting end of which stud is screw-threaded and carries a nut 26 provided with a handle 27. By tightening the nut the disk 24 is clamped to the flange 16 and shaft 14 revolves with drum 15. When the nut is loosened the drum can be turned in either direction independently of the shaft. The end of the shaft 14 extending through the bearing 10 is provided with a universal joint connection 19 to the clockwork escapement 11. On the drum 15 is wound a cable 20 which extends from the drum over a fuzee 21 formed on the end of the shaft of the receiving-roll 6. After passing over the fuzee 21, the cable 20 extends downwardly through a slot 22 formed in the base plate 1 and beneath the base plate is attached to a weight 23 (Fig. 2).

Seated in a circumferential groove formed in the flange 16 is an elastic split ring 28 normally engaging the flange with light friction, which ring on opposite sides of the split or opening is pivoted to a socket piece 29 (Fig. 4), within which socket piece a lever 29' may be inserted for manipulating the split ring in the act of winding up the weight. When the lever 29' is thrown to the left (Fig. 4), the ring 28 is closed and clamps the flange 16, thus turning the flange and with it the drum, but when the lever is thrown to the right the split ring is slightly opened and turns loosely on the flange 16 without moving the drum.

When the drum 15 is connected to the shaft 14 by tightening the nut 26 so that the drum and shaft revolve together and the cable 20 is passed over the fuzee at its small end, the end of the record-sheet is inserted in the slot 8 of the receiving-roll 6 and retained therein by means of the metal strip 9. By reason of the connection of the shaft of the drum 15 with the escapement 11, the cable is unwound from the drum under the influence of the weight 23 a uniform distance per unit of time. As the cable passes over the end of the fuzee, it revolves the receiving roll 6 and serves to draw the record-sheet off of the stock-roll 5 and wind it on the receiving roll 6. At each revolution of the receiving roll the diameter measured from the outside of the paper thereon through the roll is increased by just twice the thickness of the record-sheet and, if the receiving roll were driven at a uniform number of revolutions per unit of time, it is apparent that the record-sheet would be withdrawn from the stock-roll at an increased speed at each revolution. It is to compensate for this that the fuzee 21 is employed. The taper of the fuzee and the spiral thereon are so proportioned as to decrease the rate of revolution of the stock-roll itself as the diameter of the stock-roll plus the paper wound thereon increases, and by this means compensation is secured for the increase in the diameter of the receiving roll as the paper is wound thereon.

In order to provide a simple and inexpensive means for securing the end of the record-sheet to the receiving-roll at the inception of the operation, the longitudinal slot 8 is formed in the receiving-roll 6 and the metal clip 9 (Fig. 6) is pressed into the slot (Fig. 3) until the upper surface of the strip is level with the outer surface of the receiving roll. To provide for the efficient holding of the paper in the slot by this metal strip and at the same time facilitating the ready removal of the strip without the addition of any handles or other projections for that purpose, the strip 9 has formed along one edge thereof pairs of kerfs 30 leaving a tongue 31 between the kerfs (see Fig. 6). These tongues 31 are slightly sprung to one side out of the plane of the metal strip and, when the latter is forced into the slot 8 in the receiving roll 6, the surfaces of the tongues 31 bear against the metal surface of the slot, that is, the lefthand side thereof in Fig. 3, while the broader surfaces 32 of the strip bear against the paper. The paper being drawn at approximately right angles across the edge of the slot 8 and the receiving-roll being revolved in the direction of the arrow Fig. 3, it will be seen that the paper is efficiently held in the slot. By reason of the fact that the friction of metal against metal is less than that of paper against the metal, and by reason of the further fact that the metallic surfaces in frictional contact are much less in extent than the surfaces of metal and paper that are in contact, all that is necessary to withdraw the metal strip from the slot is to pull the paper vertically upward, when the parts are in the position shown in Fig. 3. When this is done, the paper and the metal strip both come out of the slot 8 together.

The end of the paper that enters the slot 8 in the receiving-roll 6 must be accurately positioned so that the line of movement of the paper shall be exactly at right angles to the slot, and in order to secure this result it is essential that the paper be accurately creased near its end before the latter is inserted in the slot, to the end that the crease shall be positioned at the edge of the slot as shown at 33 (Fig. 3). For the purpose of accurately creasing the end of the record-sheet, a bar 34 is supported on brackets 35, 36, formed on the standards 2 and 3, respectively. The outer edge of this bar 34 is in exact parallelism with the slot 8 in the receiving-roll 6 and the axis of the stock-roll. Supported on the bar 34 (see Fig. 5) is a flat bar 37 having formed therein near its ends holes 38 and 39 through which pins 40 and 41, respectively, project upwardly from the bar 34. The pin 41 and the hole 39 are near the edge of their respective bars, while the pin 40 and the hole 38 are approximately in the center of said bars, that is, midway between the sides thereof, the object of this being that the bar 37 shall not be placed upon the bar 34 wrong end to or wrong side up. As the bar 37 has its front or outer edge exactly even with the front edge of the bar 34, when the end of the record-sheet is withdrawn from the stock-roll across the bar 34 with the bar 37 placed in position, a slight backward movement of the record-roll will result in the paper invariably being drawn into a position where the lines on the record-sheet are exactly parallel with the front line of the bars 34, 37. When this position is reached, it can be readily seen by the eye and the paper is then bent straight downward and creased along said line, and this crease is the crease 33 which extends along the edge of the slot 8 in the receiving-roll 6, leaving a projecting end of the paper to be inserted in the slot 8.

This affords a very ready and highly efficient means for accurately creasing the paper and assures the proper positioning of the record-sheet at the start of the operation.

The record-sheet commonly employed in devices of this character is provided with equally spaced heavy transverse lines at a sufficient distance apart to receive a record during a period of twenty-four hours, with the space between any two of these heavy transverse lines divided by lighter transverse lines into twenty-four equal parts, the spacing of the lighter lines corresponding to one hour in the twenty-four. When the attendant has removed a record from the machine and has creased and inserted the end of the record-sheet in the slot 8 as previously described, and the style is lowered onto the record-sheet, it is essential that the point of the style should contact with the record-sheet at the proper point corresponding to the hour in the day when the record is to be started, and it is therefore essential to provide means whereby the record-sheet may be adjusted backward or forward under the style to bring the latter into contact with the record-sheet at the proper point corresponding with the hour of the day. By giving attention to the placing of the crease 33 on the sheet, the attendant can approximately fix the proper point, but for accurate and final adjustment he loosens the nut 26, whereby the drum 15 is freed to turn without revolving the shaft 14, which, it will be borne in mind, is controlled by the escapement 11 when the nut is tightened. But when the nut is loosened, the drum can revolve free from the influence of the escapement and the record-sheet can thus be moved a distance sufficient to bring the proper points of the record sheet under the style. When the parts are thus adjusted the attendant tightens the nut 26 and the machine is then free to proceed with the making of the record with the assurance that the beginning of the record corresponds with the hour indicated by the clockwork escapement 11.

Any suitable recording-device actuated by the variable force or movement to be recorded may be employed. Preferably I employ the recording mechanism shown and described in my aforesaid application Sr. No. 512,833. As the specific construction of such recording mechanism forms no part of the present invention, it need not be described in extended detail herein further than to say that it consists of two recording styles 42, 43, mounted respectively on carriages 44, 45, traveling on ways 46 (Fig. 3), said carriages being supported on rack bars 46' (Figs. 1 and 3) engaged by a pinion 47 (Fig. 2) on a shaft 48 of a grooved wheel 49 over which passes a cable 50 (Fig. 2) attached to a float 51 subjected to the variable force or movement, here shown as the rise and fall of water surface 52. The rise and fall of the float 51 serves to revolve the wheel 49 and thereby move the racks carrying the styles, one at a time, to the right or the left across the record-sheet as the same is advanced in a direct line thereunder, in a way that will be readily understood by those skilled in the art.

When the stock-roll is in position and the record-sheet secured by the metal strip 9 in the slot 8 of the receiving-roll 6 and the parts set in operation under the influence of the weight 23, the same will continue to operate for a length of time dependent upon length of cable 20 and the extent of the fuzee 21. Preferably, the length of the cable 20 and the extent of the fuzee 21 are such that, under the influence of the clockwork escapement it will require approximately thirty days for the cable to travel on the fuzee from the small end thereof to the larger end thereof, though, if desired, the fuzee may be of such length as to require a shorter or a longer time for this to occur.

The record made by the machine may be taken off as often as desired, every day, every other day, every week or every month, and the amount of the record-sheet removed when the record is thus taken off will depend entirely upon the length of time that the removed record covers. Heretofore, in records of this description (so-called eight-day recorders for example), if a record for one day is removed, it is necessary to take off or remove from the machine the same amount of the record-sheet that would be required for the full eight days, whereas with the machine of the present invention the extent or amount of the record-sheet removed is proportioned to the number of days of record that is removed. This effects a very material saving not only in the amount of the record-sheet employed but in the storage space required for such records. For example, supposing the machine has been operating for a single day and the attendant desires to remove the record for that day. Referring to Fig. 2, he first cuts the record-sheet to the rear of the styles 42, 43, and he then proceeds to wind up the cable on the drum 15 through the medium of the lever 29' and the split ring 28 until the cable 20 is returned on the fuzee 21 to the small end thereof. When the cable thus reaches the small end of the fuzee, the record-sheet on the receiving roll 6 will be unwound and the attendant takes hold of the record-sheet and pulls it from the slot 8, at the same time drawing the metal strip 9 therewith as previously described. This guarantees that at the starting of the operation for making a new record the cable 20 on the fuzee 21 will be at the small end of the latter, since the only way to remove the record from the receiving roll is to return the fuzee to the proper position for starting the new record. The importance of this will be appreciated when consideration is given to the fact that unless the cable is at the small end of the fuzee at their inception of making a record, the proper speed would not be imparted to the roll to give the record-sheet the required linear movement per unit of time past the styles, and hence it is of the utmost importance that care be taken to guard against a careless employee failing to adjust the parts. By providing for automatic adjustment as above indicated, this is rendered impossible.

It will be seen that the device is one of great simplicity employing a minimum number of parts; using a stock-roll that is supplied by dealers in record paper and a small receiving roll which may be of commercial size of brass tubing machined to proper diameter. All of the parts are of simple construction, capable of being made with great facility by an ordinary mechanic; they are readily assembled and disassembled and yet operate with extreme accuracy. The compactness of the device enables all of the parts to be assembled upon a comparatively small base plate, and as these base plates are expensive and are paid for by the pound, it will be apparent that any saving in size of such plates constitutes a material saving in the cost of the device as a whole.

What I claim as new is:—

1. In a recorder for recording a variable force or movement, the combination of a record-sheet and means actuated by the variable force or movement tracing a record line thereon, with means moving at a uniformly decreasing rate of speed and imparting movement to the record-sheet at a uniform rate of speed.

2. In a recorder for recording a variable force or movement, the combination of a record-sheet and means actuated by the variable force or movement tracing a record line thereon, with a receiving roll on which the record-sheet is wound, and means revolving said roll at a uniformly decreasing rate of speed, whereby the record-sheet is advanced past the recording means at a uniform rate of speed.

3. In a recorder for recording a variable force or movement, the combination of a record-sheet, means actuated by the variable force or movement for tracing a recrod line thereon, with a receiving roll acting to advance the record-sheet past the recording means, and a weight-driven timed fuzee actuating said roll.

4. In a recorder for recording a variable force or movement, the combination of a stock roll having a record-sheet wound thereon, and means actuated by the variable force or movement for tracing a record line on the record-sheet while on said stock roll, a receiving roll by which the record-sheet is withdrawn directly from the stock roll, and a timed weight-driven fuzee operatively connected to said receiving roll.

5. In a recorder for recording a variable force or movement, the combination of a record-sheet and means actuated by the variable force or movement for tracing a record line thereon, with a roll for receiving and advancing said sheet past said recording means, a fuzee connected to said roll, a winding drum, a timing escapement therefor, and a weight-driven cable passing from said drum over said fuzee whereby the record-sheet is simultaneously advanced in a right line past the recording means and wound on the roll at a uniform rate of speed.

6. In a recorder for recording a variable force or movement, the combination of a stock roll having a record-sheet wound thereon, means actuated by the variable force or movement for tracing a record line on the record-sheet while on said stock roll, a receiving roll by which the record-sheet is withdrawn directly from the stock roll, and means driving said receiving roll at a gradually and uniformly decreasing speed.

7. In a recorder for recording a variable force or movement, the combination of a stock roll having a record-sheet wound thereon, means actuated by the variable force or movement and tracing a record line on the record-sheet while on said stock roll, a drum having a cable wound thereon, a weight on said cable, a timed escapement connected to said drum, a receiving roll by which the record-sheet is unwound from the stock roll, and a fuzee connected to the receiving roll and engaged by the cable.

8. In a recorder for recording a variable force or movement, the combination of a stock roll having a record-sheet wound thereon, and means actuated by the variable force or movement for tracing a record line on the record-sheet while on said stock roll, with a receiving roll for receiving and withdrawing the record-sheet from the stock-roll, and timed operating means for said receiving roll, said operating means decreasing the speed of revolution of the receiving roll as the record-sheet is wound on said roll.

9. In a recorder for recording a variable force or movement, the combination of a record-sheet and means actuated by the variable force or movement for tracing a record line thereon, with means for advancing the record-sheet past said recording means, a drum, a weighted cable wound on said drum whereby the latter is driven, operating connections between said cable and said sheet-advancing means, an escapement timing the unwinding movement of said cable, a circumferentially grooved flange on said drum, and a circumferential clamp seated in said groove and frictionally engaging the same when moved in one direction but freely movable thereon in the reverse direction, whereby the drum can be readily wound.

10. In a recorder for recording a variable force or movement, the combination of a record-sheet and means actuated by the variable force or movement tracing a record line thereon, with a receiving roll having a longitudinal slot formed therein to receive the end of the record-sheet, and a strip or bar in said slot for retaining the end of the paper therein, said strip or bar having resilient members which on one side of the bar bear against the metal of the roll and on the other side of the bar against the record-sheet.

11. In a recorder for recording a variable force or movement, the combination of a record-sheet and means actuated by the variable force or movement for tracing a record line thereon, with a receiving roll having a longitudinal slot therein and a retaining bar in said slot, said bar being provided with resilient members of narrow surface bearing against the metal at one side of the slot and corresponding members of extended surface bearing against the record-sheet in said slot, whereby upon withdrawing the paper from the slot the bar is readily withdrawn therewith.

12. In a recorder for recording a variable force or movement, the combination of a record-sheet and means actuated by the variable force or movement for tracing a record line thereon, a receiving roll having a longitudinal slot therein for receiving the end of the record-sheet, and a resilient metal strip entering the slot to hold the end of the paper therein, said strip having pairs of closely spaced kerfs formed in one edge thereof, whereby narrow spring tongues are formed bearing against the metal of the roll, while the broad surfaces of the strip bear against the surface of the paper, whereby a pull upon the paper readily withdraws the strip with the paper.

13. In a recorder for recording a variable force or movement, the combination of a stock roll, a receiving roll withdrawing the record sheet from said stock roll, and means actuated by the variable force or movement for tracing a record line on the record sheet while on said stock roll, with means driving said receiving roll; said means comprising a motor, operative connections between said receiving-roll and motor, a time escapement controlling said motor, and means for connecting and disconnecting said escapement and motor, whereby the record sheet may be adjusted independent of said escapement.

14. In a recorder for recording a variable force or movement, the combination of a stock roll, a paper creasing shoulder parallel with the axis of said roll, a bar for resting on the paper above said shoulder, and means retaining said bar with one edge thereof parallel with said shoulder with the paper therebetween.

15. In a recorder for recording a variable force or movement, the combination of a stock roll with means parallel with the axis of said roll for forming a crease in the paper parallel with the axis of the roll.

16. In a recorder for recording a variable force or movement, the combination of a stock roll having a record-sheet wound thereon, a receiving roll having a slot therein parallel with the axis of the stock roll, and a sheet-creasing shoulder parallel with said slot.

17. In a recorder for recording a variable force or movement, the combination of a stock roll having a record-sheet wound thereon, a receiving roll having a slot therein parallel with the axis of the stock roll, a sheet-creasing shoulder parallel with said slot, and a bar to rest upon the paper above said shoulder.

In testimony whereof I have signed this specification.

CARL H. AU.